United States Patent [19]

Sheller

[11] Patent Number: 5,532,453
[45] Date of Patent: Jul. 2, 1996

[54] PROCESS FOR WELDING A STACK OF THIN METAL SHEETS

[75] Inventor: David T. Sheller, Garrettsville, Ohio

[73] Assignee: W. R. Grace & Co.-Conn., New York, N.Y.

[21] Appl. No.: 418,370

[22] Filed: Apr. 7, 1995

[51] Int. Cl.⁶ .................................................. B23K 9/007
[52] U.S. Cl. ................. 219/127; 219/121.64; 219/137 R
[58] Field of Search .............................. 219/127, 121.63, 219/121.64, 137 R, 74, 78.11, 78.12

[56] References Cited

U.S. PATENT DOCUMENTS

| | | | |
|---|---|---|---|
| 2,871,336 | 1/1959 | Lobosco et al. | 219/74 |
| 2,922,023 | 1/1960 | Hackman et al. | 219/127 |
| 3,476,908 | 11/1969 | Frindel | 219/127 |
| 3,585,350 | 6/1971 | Voytko | 219/121.63 |
| 5,115,115 | 5/1992 | Alborante | 219/121.63 |
| 5,324,913 | 6/1994 | Oberg et al. | 219/121.63 |
| 5,437,936 | 8/1995 | Johnson | 219/121.63 |

OTHER PUBLICATIONS

"Welding Hanbook" vol. 2, Eighth Edition 1991, 1992 Gas Tungsten Arc Welding Chapter 3, pp. 74–107.
Ibid. pp. 908–909 "Pressure Gas Welding".

Primary Examiner—Clifford C. Shaw
Attorney, Agent, or Firm—Beverly J. Artale

[57] ABSTRACT

There has been provided a process for spot welding a stack of thin metal strips or layers with a non-depositing welder gun. The process involves forming a stack of thin metal layers, compressing the layers between the jaws of a press, one of which has at least one receptacle for and adapted to receive the non-depositing welder gun tip, placing the gun in the receptacle, optionally flooding with an inert gas, and applying electrical power to the gun for a period of from 1 to 10 seconds. The process is especially useful in the formation of a stack of thin metal strips for making a multicellular honeycomb converter body for removing pollutants from the exhaust of an internal combustion engine.

17 Claims, 2 Drawing Sheets

PROCESS FOR WELDING A STACK OF THIN METAL SHEETS

This invention relates, as indicated, to a process for welding together a stack of thin metal sheets or layers with a pure weld, i.e., the metal from one sheet is melted sufficiently to bond that sheet to the melted metal of a contiguous sheet. The area of time weld is very small, e.g., about 1/8" to about 1/4" wide all the way through the stack. The integrity of the weld is excellent.

The invention has particular applicability to the manufacture of multicellular honeycomb catalytic converter cores for use on automotive vehicles. They may be electrically heatable or not, as desired.

BACKGROUND OF THE INVENTION AND PRIOR ART

This invention will be described in connection with embodiments especially adapted for use in exhaust lines from various types of engines, e.g., internal combustion engines of the spark ignited or compression ignited types, stationary or mobile, or gas turbines. It will be understood that the converters of the present invention may be used to effect various chemical reactions, particularly those occurring in fluid streams, especially gas streams, and which reactions are catalyzed or uncatalyzed. A particular reaction is oxidation of pollutant materials contained in exhaust streams from internal combustion engines.

Catalytic converters containing a corrugated thin metal (stainless steel) monolith have been known since the early 1970's. See Kitzner U.S. Pat. Nos. 3,768,982 and 3,770,389 each dated 30 Oct. 1973. More recently, corrugated thin metal monoliths have been disclosed in U.S. Pat. No. 4,711,009 dated 8 Dec. 1987 to Cornelison et al which discloses a process for making precoated corrugated thin metal strips in a continuous manner, and accordion folding them into predetermined shapes; U.S. Pat. Nos. 4,152,302 dated 1 May 1979, 4,273,681 dated 16 Jun. 1981, 4,282,186 dated 4 Aug, 1981, 4,381,590 dated 3 May 1983, 4,400,860 dated 30 Aug. 1983, 4,159,120 dated 28 May 1985. 4,521, 947 dated 11 Jun. 1985, 4,647,435 dated 3 Mar. 1987, 4,665,051 dated 12 May 1987 all to Nonnenmann alone or with another and which disclose multicellular honeycomb converters with corrugated and flat thin metal strips all brazed together; U.S. Pat. No. 5,070,694 dated 10 Dec. 1991 to Whittenberger which discloses spirally wound converters with corrugated strips and flat strips. International PCT Publication WO 90/12951 published 9 Apr. 1990 seeks to improve axial strength by form locking layers of insulated plates. Another reference which seeks to improve axial strength is U.S. Pat. No. 5,055,275 dated 8 Oct. 1991 to Kannainian et al. Reference may also be had to International PCT Publication No. 92/13626 filed 29 Jan. 1992. This application relates to a multicellular honeycomb converter body along an axis of which fluid can flow through a plurality of channels. The honeycomb has at least two discs in axially spaced relation to each other. According to the specification, there is at least one bar type support near the axis by which the discs are connected together and mutually supported. The invention is said to make possible design of the first disc for fast heating up through hot exhaust gas passing through, or applied electrical current. The honeycomb body serves as a support for catalyst in the exhaust system of an internal combustion engine. Another reference is German Patent Application 4,102,890 A1 filed 31 Jan. 1991 and published 6 Aug. 1992. This application discloses a spirally wound corrugated and flat strips combination wherein the flat strip contains slots and perforations and is electrically heatable. The flat strips include a bridge between leading and trailing portions. Groups of strips are separated by insulation means. Another reference is U.S. Pat. No. 5,102,743 dated 7 Apr. 1992. This patent discloses a honeycomb catalyst carrier body of round, oval, or elliptical cross-section including a jacket tube and a stack of at least partially structured sheet metal layers intertwined in different directions in the jacket tube. The stack has a given length and a given width. At least one of the sheet metal layers has a greater thickness over at least a part of one of the dimensions than others of the layers. Such at least one layer is formed of thicker metal or of a plurality of identically structured metal sheets in contiguous relation.

A common problem with many of the prior devices has been their inability to survive severe automotive industry tests which are known as the Hot Shake Test and the Hot Cycling Test.

The Hot Shake test involves oscillating (100 to 200 Hertz and 28 to 60 G inertial loading) the device in a vertical attitude at a high temperature (between 800 and 950 degrees C.; 1472 to 1742 degrees F., respectively) with exhaust gas from a gas burner or a running internal combustion engine simultaneously passing through the device. If the device telescopes, or displays separation or folding over of the leading or upstream edges the foil leaves, or shows other mechanical deformation or breakage up to a predetermined time, e.g., 5 to 200 hours, the device is said to fail the test.

The Hot Cycling Test is run with exhaust flowing at 800 to 950 degrees C.; (1472 to 1742 degrees F. ) and cycled to 120 to 200 degrees C. once every 10 to 20 minutes for 300 hours. Telescoping or separation of the leading edges of the thin metal foil strips, or mechanical deformation or breakage is considered a failure.

The Hot Shake Test and the Hot Cycling Test are hereinafter called "Hot Tests" and have proved very difficult to survive. The structures of the present invention will survive these Hot Tests.

In the following description, reference will be made to "ferritic" stainless steel. A suitable ferritic stainless steel is described in U.S. Pat. No. 4,414,023 dated 8 Nov. 1983 to Aggen. A specific ferritic stainless steel alloy useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV."

Another stainless steel metal alloy especially useful herein is identified as Haynes 214 alloy which is conunercially available. This alloy and other useful nickeliferous alloys are described in U.S. Pat. No. 4,671,931 dated 9 Jun. 1987 to Herchenroeder et al. These alloys are characterized by high resistance to oxidation and high temperatures. A specific example contains 75% nickel, 16% chromium, 4.5% aluminum, 3% iron, optionally trace amounts of one or more rare earth metals except yttrium, 0.05% carbon, and steel making impurities. Haynes 230 alloy, also useful herein has a composition containing 22% chromium, 14% tungsten, 2% molybdenum, 0.10% carbon, a trace amount of lanthanum, balance nickel.

The ferritic stainless steels, and the Haynes alloys 214 and 230, all of which are considered to be stainless steel, are examples of high temperature resistive, oxidation resistant (or corrosion resistant) metal alloys that are useful for use in making thin metal strips for the multicellular honeycomb converter bodies, or monoliths, hereof. Suitable metal alloys must be able to withstand "high" temperatures, e.g., from 900 degrees C. to 1200 degrees C. (1652 degrees F. to 2012 degrees F.) over prolonged periods.

Other high temperature resistive, oxidation resistant metal alloys are known and may be used herein. For most applications, and particularly automotive applications, these alloys are used as "thin" metal strips or layers, that is, having a thickness of from about 0.0005" to about 0.005", and preferably from 0.0015" to about 0.0037".

It has now been found that a preferred mode of forming a multicellular honeycomb converter body of a plurality of thin metal strips is to secure those strips at the central portions thereof and then to wind about a welded rigid center to form the honeycomb body. Reference may be had to the commonly owned application of David Thomas Sheller, Ser. No. 08/370,643 filed 10 Jan. 1995 and entitled "Reinforcing Web for a Multicellular Converter" which details the construction of such a multicellular converter. The process of the present invention provides a novel and effective way to secure the thin metal strips forming the honeycomb body into a rigid central post to facilitate winding about the welded or brazed center and to prevent axial shift of the thin metal leaves or strips of the core in response to the rigors of the Hot Tests described above.

BRIEF STATEMENT OF THE INVENTION

Briefly stated, the present invention is a method for welding a stack of a plurality of thin metal strips, e.g., stainless steel strips, together which comprises placing the stack between the jaws of a press having an upper jaw, preferably movable, and a lower jaw, preferably stationary, at least one of the jaws having at least one hole or receptacle therethrough of small diameter dimensioned and configured to receive the tip of a welder gun; applying a load to said stack sufficient to compress the stack and bring the surfaces of confronting thin metal strips into contact, preferably a load of at least about 1 ton, e.g., from about 1 ton to about 15 tons per square inch; inserting the welder gun into the at least one hole and into near contact (e.g., 0.010" to 0.10" clearance) with the stack of thin metal pieces; optionally applying an inert gas, e.g., argon, to the the welder gun; applying electric power to the gun at a level sufficient to initiate and to effect the weld, and for a period of at least 1 second, e.g., from about 1 second to about 15 seconds; and cooling the stack. In applying the power, the weld is started at low power, ramp up the power, dwell at high power, ramp down and off.

In more specific aspects, this invention relates to TIG welding a stack of alternating corrugated and flat thin metal strips, the central portions of which have been crushed or otherwise flattened to remove the corrugations in such central portions. The flattened central portions are to be welded together to form a rigid central post or member about which the thin metal strips may be wound to form a multicellular core for retention in a housing. Other types of welding including laser, plasma arc, other metals than tungsten, etc. may be used in the same manner to achieve substantially the same result.

BRIEF DESCRIPTION OF THE DRAWINGS

The invention may be better understood by having reference to the annexed drawings showing a preferred embodiment of the invention and wherein.

DETAILED DESCRIPTION OF THE INVENTION

As indicated above, the present invention is a process for securing a plurality of thin metal strips together by welding in one or more shots. This is an operation which those skilled in the art opined could not be done, but has been successfully done as will be described below. The welds of this invention do not add any metal, but utilize instead molten metal from the contiguous surfaces to effect the weldment. Moreover, the width of the weldment is very small, i.e., less than about 0.25" across, for example 0.125". The "thin" metal strips are a minimum of about 0.0005" thick, e.g., from about 0.0015" to about 0.0037" thick, and preferably of stainless steel. A key element of the process is the placing of the stack of thin metal strips to be welded between two jaws which can be pressurized, preferably to the extent of at least about 1 ton per square inch, e.g., from 1 to 15 tons per square inch.

While the other methods by which no metal is added, e.g., plasma arc, laser, etc., may be used according to this process, the figures will be described with reference to a TIG (tungsten inert gas) non-depositing welder which is a preferred apparatus.

Figure 1:
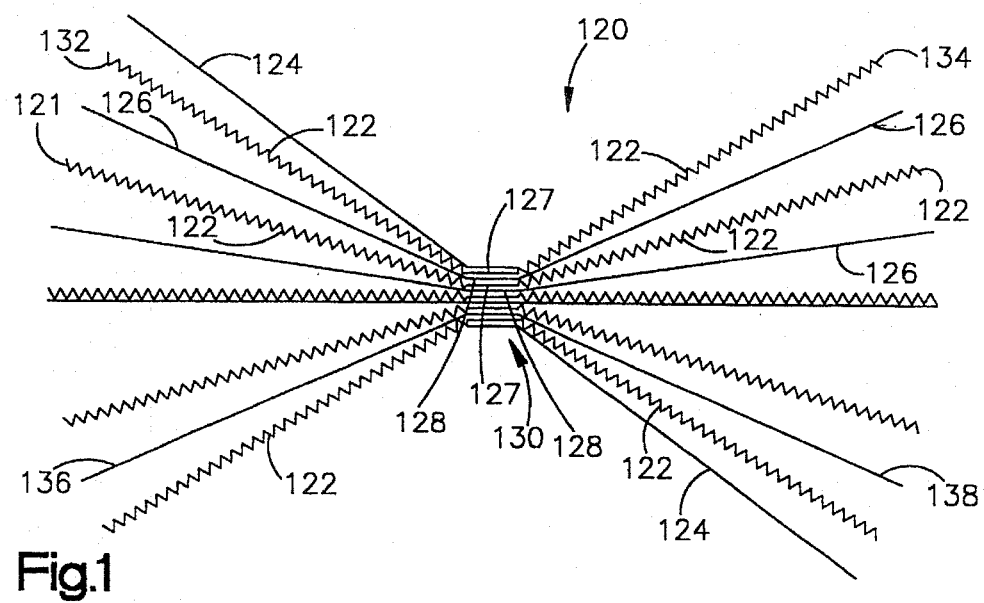
FIG. 1 shows a stack of alternating corrugated and flat thin metal strips with the center portions welded in accordance herewith to provide a rigid central post, and prior to winding and placing within a surrounding housing.

Referring now more particularly to FIG. 1, there is here shown a stack of thin metal strips, crushed in the center by a suitable die, and generally indicated by the numeral 120. This stack is composed of corrugated thin metal strips 122 and flat thin metal strips 124. It should be noted that the flat strips 124 at the top and bottom of the stack are half length flat strips and are used for the purpose of preventing nesting of the left end of the upper corrugated strip 122, and preventing nesting of the right end of the lower corrugated strip 122 when those penultimate corrugated strips are brought into contact with each other on spirally winding the stack. The individual strips 122, 124 and 126, especially when used in engine exhaust applications, must be of high temperature resistive, oxidation resistant alloy, such as those mentioned above. The corrugated thin metal strips 122 each have a flattened central portion 127, and each of the flat thin metal strips 126 and 124 has a flat central portion, or a flat end portion 128. The group or stack 120 is gathered at the flat central portions 127 and 128 and may be connected together by welding in accordance herewith. The flat central portions 127 and 128 of the layered strips 122, 124 and 126 are desirably about 3/16" to 1" wide as shown in FIG. 1. The process hereof is carried out in this area, after cleaning to remove any coating in such area, to enable bonding of the layers together to form a rigid central member 130 about which the multicellular honeycomb converter core body may be spirally wound. The layers 122, 124 and 126 are desirably crushed together with a suitable die under a heavy load (e.g., 1 to 15 tons per square inch). Ordinarily, it is desired for the corrugated thin metal sheets and the flat thin metal sheets to be treated by a process (see Cornelison et al 4,117,009, supra) which applies a coating of a refractory metal oxide, e.g., 75% gamma-alumina/25% ceria, prior to joining the several layers. There may be 3 to 80 or more such layers 122 and 126 with end layers 124 at each end of the stack 120. The coating must be removed in the central portions 127 and 128 by masking, grit blasting or rotary wire brushing. The coating should also be removed or masked (during the coating operation) at the distal ends of the thin metal sheets 122, 124 and 126 for about ⅛" to about ⅓" to enable brazing or welding of the thin metal strips to the housing, e.g., housing 22 in FIG. 2. As shown in FIG. 1, the individual thin metal strips 122 and 126 are continuous through the respective central portions 127 and 128, respectively, from one free end 132 to the free end 134 of the corrugated thin metal strips; and continuous from one free end 136 to the other free end 138 of the flat thin mental strips 126. The strips are generally from about 4" to about 24" long and from about 1" to about 8" wide.

The group of layered thin sheet metal strips of FIG. 1 is shown in expanded, uncoiled relation. The stack of FIG. 1 is gripped at the central portion with suitable legs or jaws, such as the legs of a bifurcated pin (not shown) and rotated in a clockwise manner, for example, until the thin metal strips are tightly wound in a spiraliform manner, whereby the thin metal strips 122 and 126, with half strips 124 on the outside, are brought into contiguous relation along their entire lengths. After winding and insertion in the tubular housing 22 (FIG. 2) the legs or jaws (or bifurcated pin) are removed. If the strips 122 and 126 are of equal length, the resulting configuration will be circular. If the strips 122 and 126 are of different lengths, or the flattened portions displaced from the center of the strip length, then any oval or elliptical shape may be achieved as will be understood by those skilled in the art.

Figure 2:
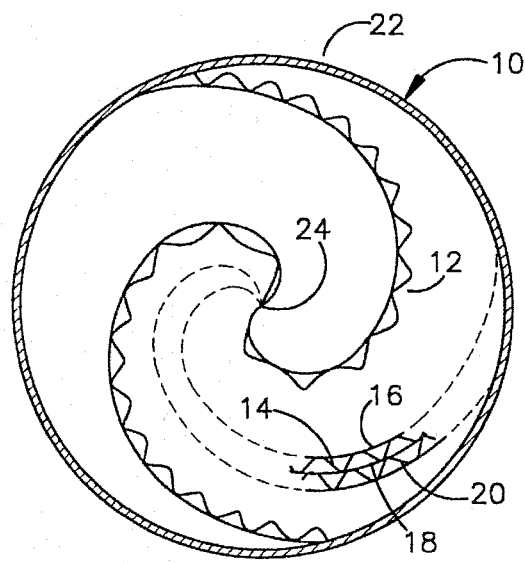
FIG. 2 shows an end view of a multicellular honeycomb converter body wound about a rigid central post or member and using the welded stack of FIG. 1.

Referring to FIG. 2, there is here shown a multicellular honeycomb converter body 10 having a wound reinforcing web 12 along with a plurality of corrugated thin metal strips 14 and 20, and flat thin metal strips 16 and 18 which form the multicellular honeycomb body 10. The wound strips, e.g., 14, 16, 18, and 20, are tightly wound and retained within a retaining housing 22, or mantle 22, which, for example, is a tubular stainless steel member. As shown in FIG. 2, the central portion 24 of the reinforcing web 12 is flattened. A brazing metal foil may be placed within the housing and between the distal ends of the thin metal foil strips 14, 16, 18, and 20, for example, for later fusion and securing to the inner surface of the housing 22.

Figure 3:
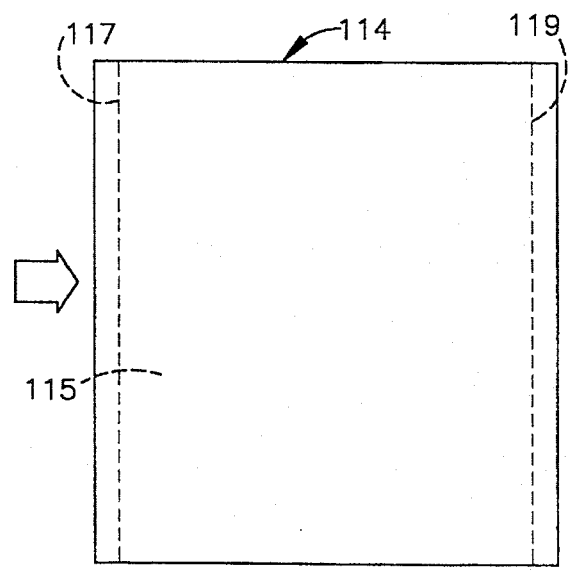
FIG. 3 is a side view of the converter body of FIG. 2.

FIG. 3 is a side elevation of the core body of FIG. 2 showing the direction of gas, or fluid, flow from the inlet or upstream end 117 to the outlet or downstream end 119 of the honeycomb core 115.

Figure 4:
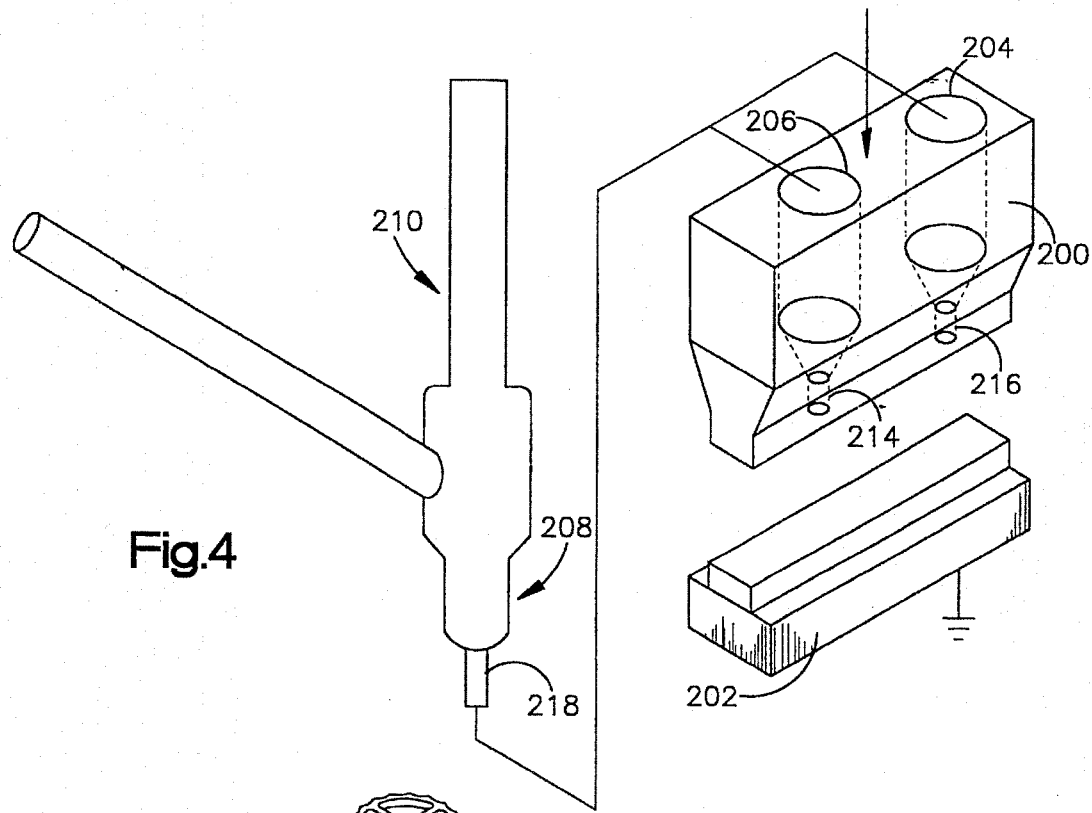
FIG. 4 is a perspective view of a pair of jaws between which the stack of thin metal sheets to be welded together is compressed and showing a TIG welder gun and shaped receptacles into which the gun may be inserted.

FIG. 4 is a diagrammatic and schematic view in perspective of an apparatus useful herein in carrying out the process hereof. There is here shown an upper, movable jaw 200 and a lower fixed jaw or anvil 202. The lower jaw 202 is desirably electrically conductive, e.g., made of copper or copper alloy, and may be grounded to complete the electrical circuit with the TIG gun. The upper movable jaw 200 is provided with two or more holes 204 and 206 adapted and configured to receive the end 208 of the TIG gun, generally indicated at 210. The small diameter holes 214 and 216 at the base of the holes 204 and 206 have a diameter of from about ¹⁄₁₆" to about ¼ ", e.g., ⅛", to receive the tip 218 of the TIG welder gun 210. The stack of thin metal strips, such as for example, that shown in FIG. 1, is placed between the jaws 200 and 202, and a load of from 1 ton to 15 tons applied by a suitable press, not shown. The TIG welder gun 210 is inserted into one of the holes 204, or 206, and the tip 218 brought into close proximity, as above indicated, with the stack 120 (FIG. 1.) at the central portion 130. The gun 210 is flooded with argon and fired by the application of electrical power for a few seconds. Thereafter, a second weld may be made by repeating the process with the gun in the other hole, whereby the stack is welded to a unitary body in the regions of the weld. The individual metal strips are thus secured against axial displacement by the Hot Tests. The pressure is released and the stack ready to be wound to form the multicellular honeycomb core of FIG. 2.

Figure 5:
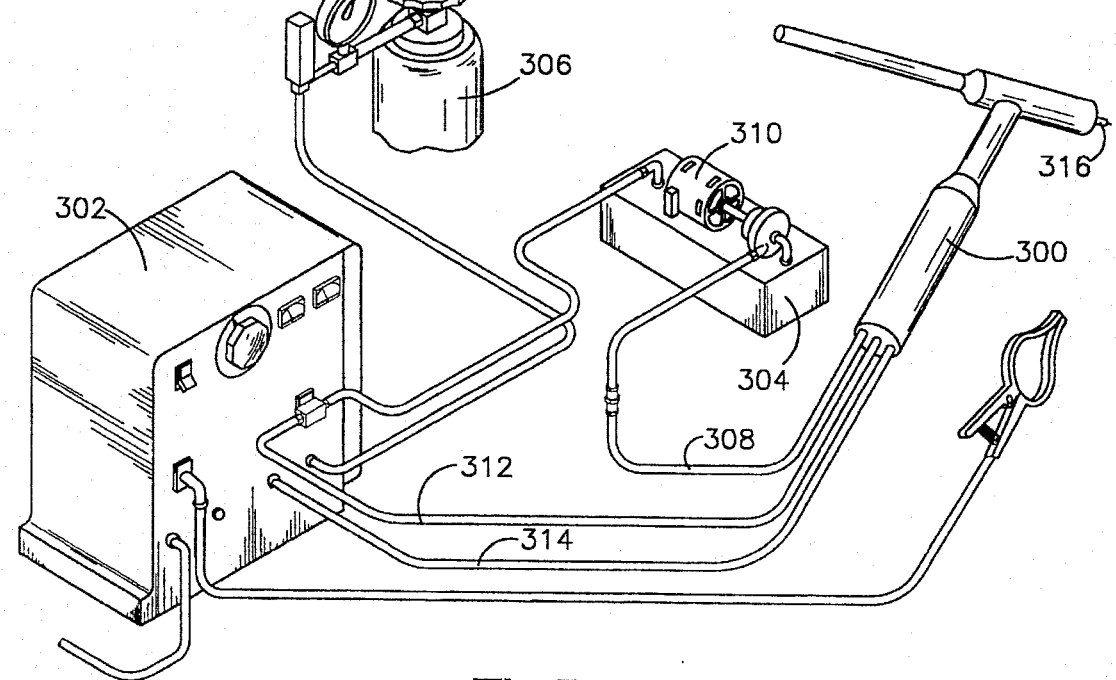
FIG. 5 is a diagrammatic and schematic view of a TIG welder gun and its hook-up to an electrical controller, to a circulating water supply, and to an inert gas supply.

FIG. 5 is a diagrammatic and schematic perspective view showing the hook-up for a TIG welder and useful in the present process. There is shown in FIG. 5 a TIG gun 300 such as described above, a suitable power controller 302, a water circulator pump and reservoir 304 and a cylinder of argon gas. Water is fed into the gun for cooling purposes through the line and returns to the circulating pump 310 through the tubular power cable 312. The tubular power cable 312 serves a dual function of also supplying electrical power to the TIG welder gun 300 from the power controller 302. Gas from the cylinder 306 enters the TIG welder gun 300 through the line 314. The tip 316 of the TIG welder gun 300 is placed within one of the holes 204 or 206 (FIG. 4) to effect the welding operation. The gun 300 can be fired from the controller 302 at will. The voltage and current are determined by the thickness of the stack 120 (FIG. 1) and may be manually set into the controller 302.

As indicated above, the power is "ramped" up or down, that is, it is raised, or held (dwell) or lowered until the temperature in the body being welded is at a desired point. For TIG welding a ferritic stainless steel, the initial temperature is melt temperature of the alloy (above about 2350 degrees F.), the dwell temperature is the melt temperature and depends upon the number and thickness of the sheets forming the stack of thin metal sheets, and the final temperature is, of course, less than the melting point. These temperatures can be accurately controlled by the power controller 302 (FIG. 5). In a specific case, the power controller was a Miller Synchronous Constant Current AC/DC arc welding power source manufactured by Miller Electric Manufacturing Co. As is known, with the TIG welder, an arc is first struck, and as the temperature reaches the melting point of the work pieces, there occurs an audible change in the sound emanating from the power controller.

Figure 6:
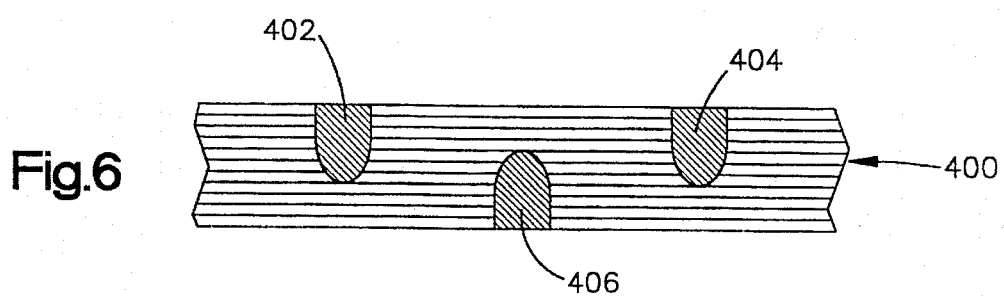
FIG. 6 is a representation of the welds in a stack of thin metal strips where the stack is particularly thick, e.g., from 40 to 80 thin metal strips, and welds are made from each side of the stack.

FIG. 6 is a fragmentary diagrammatic representation of the welds in a relatively thick stack, e.g., from 40 to 80 thin metal sheets, showing an offset pattern. Thus, there is shown a thick stack of thin metal sheets 400 having welds 402, 404, and 406 extending into the stack. Each weld 402, 404, and 406 extends into the relatively thick stack more than halfway. Welds 402 and 404 are made using holes 204 and 206 (FIG. 4) in the upper jaw 200. Weld 406 is made through the lower jaw, e.g., jaw 202 (FIG. 4) using a hole similarly dimensioned and configured (not shown) in the lower jaw, e.g., jaw 202 (FIG. 4). It should be noted that the welds are offset, and hence the holes through the jaws 200 and 202 (FIG. 4) would also have the welder tip holes, e.g., holes 204 and 206 in the upper jaw 200, and an offset hole (not shown) in the lower jaw.

The TIG welder gun and the power controller are commercially available pieces of equipment.

The principals of this invention are useful in devices utilizing joined multiple layers of metal, for example capacitors and batteries, transformers and motors, structural honeycombs for aircraft and other lightweight applications, impact or sound absorbent honeycomb structures, laminated pressure vessels or tanks, air-gap thermal insulators, such as furnace ducts or chimney pipes, honeycomb heat sinks, honeycomb packings, structural laminates, such as teeth for diggers.

What is claimed is:

1. A method for welding a stack of thin metal pieces together without adding any metal which comprises (a) providing a stack of at least 3 thin metal sheets or strips said thin metal sheets or strips having a thickness of at least 0.0005" to 0.0037"; (b) placing said stack between the jaws of a press having an upper jaw and a lower jaw, at least one of said jaws having at least one receptacle for and dimensioned and configured to receive the end of a non-depositing welder gun; (c) applying to said stack a load of at least about 1 ton per square inch sufficient to compress the stack and bring the confronting surfaces of the thin metal strips into contact; (d) inserting the end of said welder gun into said at least one hole and into close proximity of from 0.01" to 0.1" with said stack of thin metal sheets; (e) applying power at a level sufficient to fire said gun; (f) raising the power level to a level sufficient to melt the thin metal; (g) holding the power at such level; and (h) turning the power off, the period of time for the application of power in steps (e) to (h) being from 1 to 15 seconds.

2. A process as defined in claim 1 wherein the non-depositing welder is a tungsten inert gas welder.

3. A process as defined in claim 2 wherein the inert gas comprises argon.

4. A process as defined in claim 2 wherein the inert gas comprises a mixture of argon and hydrogen.

5. A product produced by the process of claim 2.

6. A process as defined in claim 1 wherein the non-depositing welder is a plasma arc welder.

7. A process as defined in claim 1 wherein the non-depositing welder is a laser welder.

8. A process as defined in claim 1 wherein the thin metal sheets or strips are stainless steel.

9. A process as defined in claim 1 wherein the metal sheets or strips are ferritic stainless steel.

10. A process as defined in claim 1 wherein the metal sheets or strips are a nickel/chromium containing alloy.

11. A process as defined in claim 1 wherein the upper jaw of said press is movable and the lower jaw is stationary.

12. A process as defined in claim 11 wherein the upper jaw includes at least one receptacle dimensioned and configured to receive the end of said non-depositing welder gun.

13. A process as defined in claim 1 wherein some of said thin metal sheets or strips are corrugated, and the remainder are flat.

14. A process as defined in claim 1 further including the step of applying an inert gas to said welder gun.

15. A process as defined in claim 1 wherein each of the jaws has at least one receptacle dimensioned and configured to receive the end of a non-depositing welder gun.

16. A process as defined in claim 15 wherein one of the jaws has a plurality of receptacles, and the other has at least one receptacle offset from the others.

17. A product produced by the process of claim 1.

* * * * *